US012794502B2

(12) United States Patent
Pentakota et al.

(10) Patent No.: US 12,794,502 B2
(45) Date of Patent: Nov. 10, 2026

(54) ANALOG-TO-DIGITAL CONVERTER (ADC) FRONT-END SYSTEM

(71) Applicant: TEXAS INSTRUMENTS INCORPORATED, Dallas, TX (US)

(72) Inventors: Visvesvaraya A. Pentakota, Bangalore (IN); Sovan Ghosh, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/397,868

(22) Filed: Dec. 27, 2023

(65) Prior Publication Data

US 2025/0023594 A1 Jan. 16, 2025

(30) Foreign Application Priority Data

Jul. 14, 2023 (IN) ............................ 202341047473

(51) Int. Cl.
*H04B 1/16* (2006.01)

(52) U.S. Cl.
CPC ..................................... *H04B 1/16* (2013.01)

(58) Field of Classification Search
CPC . H04B 1/0007; H03K 17/145; H03M 1/1245; H03M 1/004; H03M 1/466; H03M 1/124; H03M 1/12; H03M 1/00; H03G 1/0094
See application file for complete search history.

(56) References Cited

U.S. PATENT DOCUMENTS

| | | | | |
|---|---|---|---|---|
| 8,902,093 | B1 * | 12/2014 | Leuciuc | H03M 1/1245 341/172 |
| 8,902,094 | B1 * | 12/2014 | Zhang | H03L 7/0814 341/122 |
| 10,084,467 | B1 * | 9/2018 | Chang | H03M 1/38 |
| 10,476,542 | B1 * | 11/2019 | Shrivastava | H04B 1/18 |
| 10,911,060 | B1 * | 2/2021 | Neto | G11C 27/02 |

(Continued)

OTHER PUBLICATIONS

Saeid Daneshgar; Zach Griffith; Munkyo Seo; Mark J. W. Rodwell, Low Distortion 50 GSamples/s Track-Hold and Sample-Hold Amplifiers, IEEE Journal of Solid-State Circuits, vol. 49, Issue: 10, Oct. 2014 (Year: 2014).*

(Continued)

*Primary Examiner* — Aristocratis Fotakis
(74) *Attorney, Agent, or Firm* — Xianghui Huang; Charles F. Koch

(57) ABSTRACT

One example includes an analog-to-digital converter (ADC) front-end system. The system includes a digital step attenuator (DSA) having an input and an output. The system also includes a sampling system having an input coupled to the output of the DSA. The sampling system includes a first sampling capacitor, a second sampling capacitor, and at least one sampling switch. The sampling system can be configured to sample an analog signal current provided from the DSA on the first sampling capacitor and the second sampling capacitor concurrently in response to activation of the at least one sampling switch to integrate the analog signal current as a sampling voltage on both the first and second sampling capacitors. The system further includes an ADC having an input and an output, the input of the ADC coupled to the output of the sampling system.

20 Claims, 7 Drawing Sheets

(56) References Cited

U.S. PATENT DOCUMENTS

| | | | | |
|---|---|---|---|---|
| 2011/0211100 | A1* | 9/2011 | Yin | H04N 23/741 348/300 |
| 2012/0309337 | A1* | 12/2012 | Zhu | H03M 1/1215 341/122 |
| 2017/0338832 | A1* | 11/2017 | Voinigescu | G11C 27/026 |
| 2019/0173481 | A1* | 6/2019 | Ali | H03M 1/1225 |
| 2020/0186146 | A1* | 6/2020 | Bogner | H03K 17/687 |

OTHER PUBLICATIONS

Hao Ding ,Danyu Wu, Xuqiang Zheng, Lei Zhou, Teng Chen, Fangxu Lv, Jianye Wang, Baifeng An, Jin Wu and Xinyu Liu, A Low-Distortion 20 GS/s Four-Channel Time-Interleaved Sample-and-Hold Amplifier in 0.18 µm SiGe BiCMOS, Electronics 2020, Dec. 24, 2019 (Year: 2019).*

* cited by examiner

ANALOG-TO-DIGITAL CONVERTER (ADC) FRONT-END SYSTEM

RELATED APPLICATIONS

This application claims priority from Indian Provisional Patent Application Serial No. 202341047473, filed 14 Jul. 2023, which is incorporated herein in its entirety.

TECHNICAL FIELD

This description relates to electronic circuits, and more specifically to an analog-to-digital converter (ADC) front-end system.

BACKGROUND

Digital signal processing requires the conversion of analog signals into a digital form. The analog signals can be provided as communication signals, such as from a transmission line that propagate the communication signals or from an antenna that receives the communication signals wirelessly. The conversion of the analog communication signals to digital communication signals is provided by an analog-to-digital converter (ADC), such as provided in a front-end of a receiver. The front-end can include a variety of electrical components that condition the analog signal(s) received at the receiver and provide a sampled analog signal (e.g., current and/or voltage) to be converted to a digital code via the ADC.

SUMMARY

One example includes a system. The system includes a digital step attenuator (DSA) having an input and an output. The system also includes a sampling system having an input coupled to the output of the DSA. The sampling system includes a first sampling capacitor, a second sampling capacitor, and at least one sampling switch. The sampling system can be configured to sample an analog signal current provided from the DSA on the first sampling capacitor and the second sampling capacitor concurrently in response to activation of the at least one sampling switch to integrate the analog signal current as a sampling voltage on both the first and second sampling capacitors. The system further includes an ADC having an input and an output, the input of the ADC coupled to the output of the sampling system.

Another example includes a system. The system includes digital step attenuator (DSA) having an input and an output, a first sampling capacitor having a terminal coupled to the output of the DSA, and a first sampling switch having first and second terminals. The first terminal of the first sampling switch can be coupled to the output of the DSA. The system also includes a second sampling switch having first and second terminals. The first terminal of the second sampling switch can be coupled to the second terminal of the first sampling switch. The system further includes a second sampling capacitor having a terminal coupled to the second terminal of the second sampling switch, and an ADC having an input and an output, the input of the ADC coupled to the terminal of the second sampling capacitor.

Another example includes a method. The method includes receiving an analog input signal and providing an analog signal current, representative of the analog input signal, at an output of a digital step attenuator for direct sampling by a first sampling capacitor. The method also includes activating a first sampling switch coupled to the first sampling capacitor for a first time duration and activating a second sampling switch to couple a second sampling capacitor to the first sampling capacitor for a second time duration, in which a portion of the second time duration overlaps a portion of the first time duration, to provide an analog voltage. The method further includes converting the analog voltage to the digital output signal.

DETAILED DESCRIPTION

Figure 1:
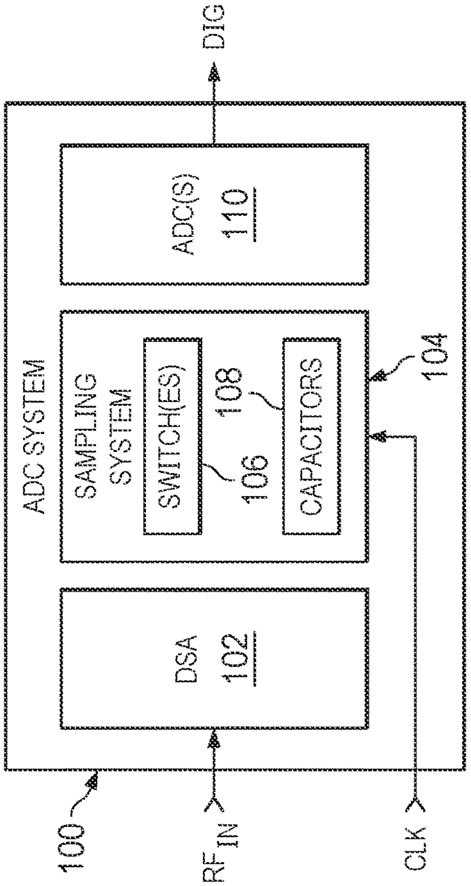
FIG. 1 is an example block diagram of an analog-to-digital converter (ADC) front-end system.

This description relates to electronic circuits, and more specifically to an analog-to-digital converter (ADC) front-end system. The ADC front-end system can be implemented in any of a variety of circuits that require conversion of analog signals to digital signals. As another example, the ADC front-end system is implemented in a receiver (e.g., or transceiver) to convert an input radio frequency (RF) signal to an analog output signal. As an example, the ADC front-end system is implemented on or as part of an integrated circuit (IC).

The ADC front-end system includes a digital step attenuator (DSA) that receives an analog input signal (e.g., an analog RF signal) and to generate an analog signal current based on the analog input signal. The ADC front-end system also includes a sampling system that samples the amplitude of the analog signal current. The sampling system includes a first sampling capacitor, a second sampling capacitor, and at least one sampling switch. The ADC front-end system samples the analog signal current on the first sampling capacitor and the second sampling capacitor concurrently based on activation of the at least one sampling switch to generate a sampling voltage on the second sampling capacitor. Therefore, the analog signal current is integrated between the first sampling capacitor and the second sampling capacitor during the concurrent sampling of the analog signal current. The sampling system is coupled at an output to an ADC.

As an example, the ADC front-end system includes a first sampling switch that is activated for a first time duration and a second sampling switch that is activated for a second time duration. As described herein, the term "activate" and forms thereof with respect to a switch refers to the closing of the switch to provide current flow through the switch. Thus, in the example of the switch being arranged as a transistor device, the term "activate" refers to providing sufficient bias at an input (e.g., gate voltage or base current) to facilitate current flow through the transistor device with minimal resistance (e.g., saturation mode). Similarly, the term "deactivate" and forms thereof with respect to a switch refers to opening the switch to cease current flow through the switch (e.g., cutoff mode of a transistor device). The activation of the first and second sampling switches can be such that a portion of the second time duration is concurrent with (e.g., overlaps) a portion of the first time duration.

By activating the first and second sampling switches concurrently during the respective portions of the first and second time durations, the analog signal current can be integrated and the capacitor charges can be redistributed between the first sampling capacitor and the second sampling capacitor. Therefore, the voltage on the second sampling capacitor can be a sampled and held analog voltage to be held at the second sampling capacitor for a sufficient time for the ADC to convert the analog voltage to a digital output signal. Additionally, the first time duration can be selected to provide for control of the sampling width of the ADC front-end system, thereby providing for control of the bandwidth of the ADC front-end system.

For example, the first sampling capacitor samples the analog signal current directly from the DSA. The first sampling switch can be arranged between the first sampling capacitor and an intermediate node, and the second sampling switch can be arranged between the intermediate node and the second sampling capacitor. For example, the intermediate node can represent a direct connection or coupling between a terminal of the first sampling switch and a terminal of the second sampling switch.

As an example, the first sampling switch is activated at a first time to begin the first time duration, during which the first sampling switch interconnects the first sampling capacitor and the intermediate node. The analog signal current can thus be integrated between the first sampling capacitor and a parasitic capacitance of the intermediate node during the first time duration to redistribute the charge on the first sampling capacitor to the parasitic capacitance of the intermediate node. The second sampling switch is activated at a second time after the first time to being the second time duration. The second time thus begins the concurrent portions of the first and second time durations, during which the first sampling capacitor, the intermediate node, and the second sampling capacitor are coupled together to provide concurrent sampling of the analog signal current on the first sampling capacitor, the intermediate node, and the second sampling capacitor. Therefore, the analog signal current can be integrated onto the first sampling capacitor, the intermediate node, and the second sampling capacitor to redistribute the charge on the first sampling capacitor and the intermediate node to the second sampling capacitor.

The first sampling switch is deactivated at a third time after the second time to conclude the first time duration. The second sampling switch is deactivated at a fourth time after the third time to conclude the second time duration. Therefore, after conclusion of the first time duration but before conclusion of the second time duration, the second sampling capacitor remains coupled to the intermediate node. Accordingly, the voltage of the parasitic capacitance of the intermediate node and the voltage of the second sampling capacitor have the same amplitude. Thus, by deactivating the first sampling switch to isolate the first sampling capacitor from the intermediate node, and by providing coupling of the intermediate node to the second sampling capacitor, frequency-dependent interleaved gain and sampling instance errors can be mitigated. Accordingly, the ADC can convert the analog voltage on the second sampling capacitor to a digital output signal that is indicative of the RF input signal.

By providing concurrent integration and charge distribution between the first and second sampling capacitors, and by providing for bandwidth control of the ADC front-end system by selecting an activation time for the first sampling capacitor, the ADC front-end system can be fabricated and operated more efficiently than other ADC front-end systems. For example, other ADC front-end systems include a fast-settling buffer to transfer the charge between a sampling capacitor and an ADC capacitor, which is obviated by the ADC front-end system described herein based on the concurrent sampling of the analog signal current by the first sampling capacitor and the second sampling capacitor. Other ADC front-end systems can also include a frequency-selective load for controlling the bandwidth of the other ADC front-end system, which can be obviated in the ADC front-end system described herein based on the selective first time duration. Accordingly, the ADC front-end system described herein can be operated at reduced power and noise in a smaller form factor than other ADC front-end systems.

FIG. 1 is an example block diagram of an analog-to-digital converter (ADC) front-end system 100. The ADC front-end system 100 can be implemented in any of a variety of circuits that require conversion of analog signals to digital signals. For example, the ADC front-end system 100 is implemented in a receiver (e.g., or transceiver) to convert an input radio frequency (RF) signal to an analog output signal. As an example, the entirety of the ADC front-end system 100 is implemented on or as part of an integrated circuit (IC).

The ADC front-end system 100 includes a digital step attenuator (DSA) 102, a sampling system 104, and one or more analog-to-digital converters (ADC(s)) 110. The DSA 102 receives an analog input signal (e.g., an analog RF signal), demonstrated in the example of FIG. 1 as a signal $RF_{IN}$. As an example, the analog input signal $RF_{IN}$ is provided from an antenna or RF transmission line. The DSA 102 can include or be configured as a transconductance amplifier, and can thus generate an analog signal current that corresponds to (or is representative or a function of) the analog input signal $RF_{IN}$. The sampling system 104 can sample the amplitude of the analog signal current to provide an analog voltage having an amplitude that corresponds to the analog signal current, and thus to the analog input signal $RF_{IN}$. In the example of FIG. 1, the sampling system 104 includes at least one switch 106 and a set of two or more capacitors 108. The set of capacitors 108 includes a first sampling capacitor and a second sampling capacitor. The at least one ADC 110 can generate a digital output signal DIG based on the analog voltage sampled on the capacitors 108.

As an example, the switch(es) 106 include a first sampling switch that is activated for a first time duration and a second sampling switch that is activated for a second time duration. The activation of the first and second sampling switches can be such that a portion of the second time duration is concurrent with a portion of the first time duration. Therefore, the analog signal current can be sampled on both the first sampling capacitor and the second sampling capacitor concurrently. Accordingly, the analog voltage corresponding to the analog signal current can be rapidly integrated as charge on the second sampling capacitor of the capacitors 108. The ADC(s) 110 can thus generate the digital output signal DIG based on the sampled analog voltage of the second sampling capacitor.

For example, the first sampling capacitor of the capacitors 108 samples the analog current directly from the DSA. The first sampling switch of the switch(es) 106 can be arranged between the first sampling capacitor and an intermediate node, and the second sampling switch of the switch(es) 106 can be arranged between the intermediate node and the second sampling capacitor of the capacitors 108. Based on the concurrent activation of the first and second sampling switches, the analog current can thus be integrated among the first sampling capacitor, a parasitic capacitance of the intermediate node, and the second sampling capacitor while redistributing the charge on the first sampling capacitor, the parasitic capacitance, and the second sampling capacitor. As described in greater detail herein, the concurrent integration of the analog current between the first sampling capacitor and the second sampling capacitor can provide for rapid sampling of the analog current at the second sampling capacitor while still allowing the analog voltage to be held at the second sampling capacitor for a sufficient time for the ADC(s) 110 to convert the analog voltage to the digital output signal DIG.

The switch(es) 106 can also include at least one reset switch that drains the charge on the first sampling capacitor and/or the second sampling capacitor to reset the sampling system 104 for a next sampling of the analog signal current. The activation of the second sampling capacitor and the reset switch(es) of the switch(es) 106 can be provided for a sufficient duration of time to provide for full sampling of the analog signal current by the second sampling capacitor and for full discharge of the first sampling capacitor and second sampling capacitor, respectively. However, as described in greater detail herein, the duration of the activation of the first sampling switch can be variable to control the sampling width, and thus the bandwidth, of the ADC front-end system 100.

By providing for the rapid integration of the analog signal current between the first and second sampling capacitors, and by providing for bandwidth control of the ADC front-end system 100 by selecting an activation time for the first sampling capacitor, the ADC front-end system 100 can be fabricated and operated more efficiently than other ADC front-end systems. For example, other ADC front-end systems include a fast-settling buffer to transfer the charge between a sampling capacitor and an ADC capacitor. Such a buffer can consume a significant amount of power, and can introduce additional noise and/or distortion into operation of the other ADC front-end systems. However, by integrating the analog signal current across the first sampling capacitor and the second sampling capacitor based on concurrent charging, the fast-settling buffer can be obviated from the ADC front-end system 100. Additionally, other ADC front-end systems can also include a frequency-selective load for controlling the bandwidth of the other ADC front-end systems. However, by controlling the sampling width, and thus the bandwidth, of the ADC front-end system 100 based on the first time duration of activation of the first sampling switch, the frequency-selective load can be obviated in the ADC front-end system 100. Accordingly, the ADC front-end system 100 described herein can be operated at reduced power and noise in a smaller form factor than other ADC front-end systems.

Figure 2:
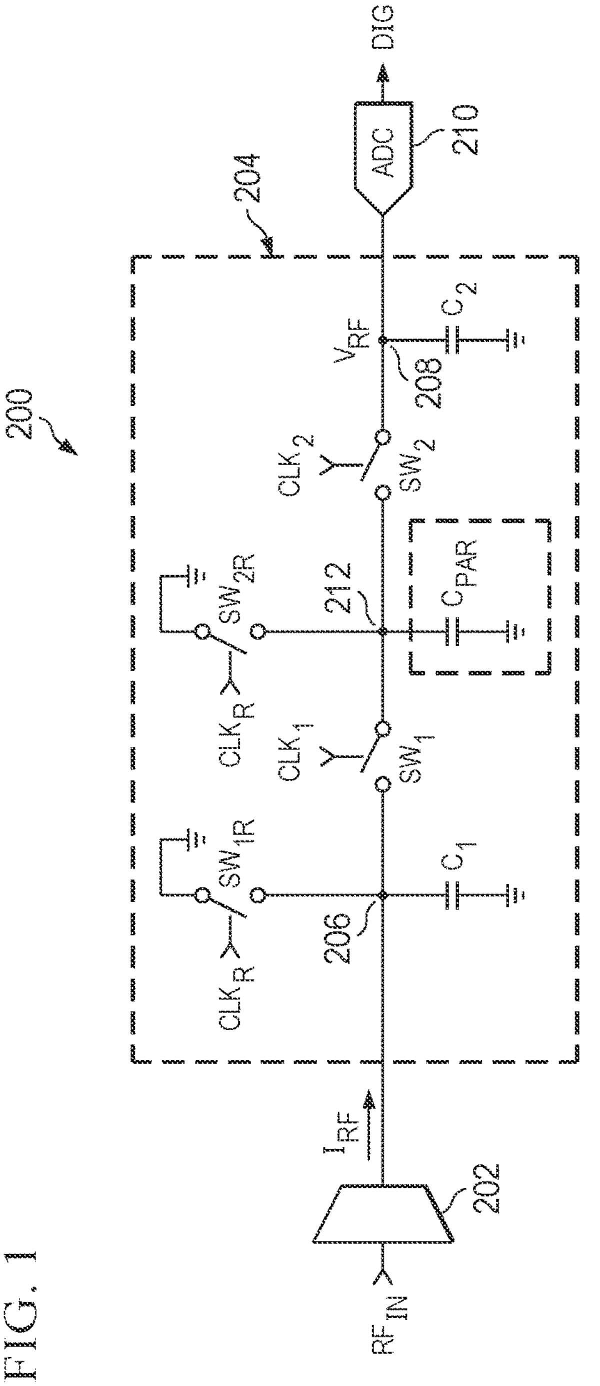
FIG. 2 is an example circuit diagram of an ADC front-end system.

FIG. 2 is an example circuit diagram of an ADC front-end system 200. The ADC front-end system 200 can correspond to the ADC front-end system 100 in the example of FIG. 1. Therefore, reference is to be made to the example of FIG. 1 in the following description of the example of FIG. 2.

The ADC front-end system 200 includes a DSA 202 and a sampling system 204. The DSA 202 receives an analog input signal (e.g., an analog RF signal), demonstrated in the example of FIG. 2 as a signal $RF_{IN}$ and to generate an analog signal current $I_{RF}$ having an amplitude that corresponds to the signal amplitude of the analog input signal $RF_{IN}$. In the example of FIG. 2, the DSA 202 is demonstrated as a transconductance amplifier, but can also include additional components that may be necessary for operation of the DSA 202. The sampling system 204 includes a first sampling capacitor $C_1$ coupled to a terminal 206 at the output of the DSA 202, and a second sampling capacitor $C_2$ coupled to a terminal 208 that is coupled to an input of an ADC 210. In the example of FIG. 2, the first sampling capacitor $C_1$ is demonstrated as a variable capacitor, such as to modify the gain associated with the ADC front-end system 200 based on the capacitance value of the first sampling capacitor $C_1$. The sampling system 204 also includes a first sampling switch $SW_1$ that interconnects the terminal 206 and an intermediate node 212, and a second sampling switch $SW_2$ that interconnects the intermediate node 212 and the terminal 208. The sampling system 204 further includes a first reset switch $SW_{1R}$ coupled to the terminal 206 and a second reset switch $SW_{2R}$ coupled to the intermediate node 212.

As shown in FIG. 2, first terminals of $C_1$, $SW_1$, and $SW_{1R}$ are coupled to the output of the DSA 202. Second terminals of $C_1$ and $SW_{1R}$ are coupled to a reference terminal (e.g., a ground terminal at a ground potential). A second terminal of $SW_1$ is coupled to first terminals of $SW_2$ and $SW_{2R}$. A second terminal of $SW_{2R}$ is coupled to the reference terminal. A second terminal of $SW_2$ is coupled to a first terminal of $C_2$ and an input of the ADC 210. A second terminal of $C_2$ is coupled to the reference terminal. A representative parasitic capacitance $C_{PAR}$ is shown between the reference terminal and an intersection of the second terminal of $SW_1$ and the first terminals of $SW_2$ and $SW_{2R}$ (in which the intersection of these three terminals is represented as the node 212).

As described herein, the first sampling switch $SW_1$ can be activated for a first time duration and the second sampling switch $SW_2$ can be activated for a second time duration, such that the first and second sampling switches $SW_1$ and $SW_2$ can be activated concurrently during an overlapping portion of the first and second time durations. Therefore, the analog signal current $I_{RF}$ can be sampled on both the first sampling capacitor $C_1$ and the second sampling capacitor $C_2$ concurrently. Accordingly, the analog voltage, demonstrated in the example of FIG. 2 as $V_{RF}$, corresponding to the analog signal current is integrated as charge on the first sampling capacitor $C_1$ and the second sampling capacitor $C_2$ to rapidly sample the analog signal current $I_{RF}$ on the second sampling capacitor $C_2$ as the analog voltage $V_{RF}$ based on which the ADC 210 can generate the digital output signal DIG.

Figure 3:
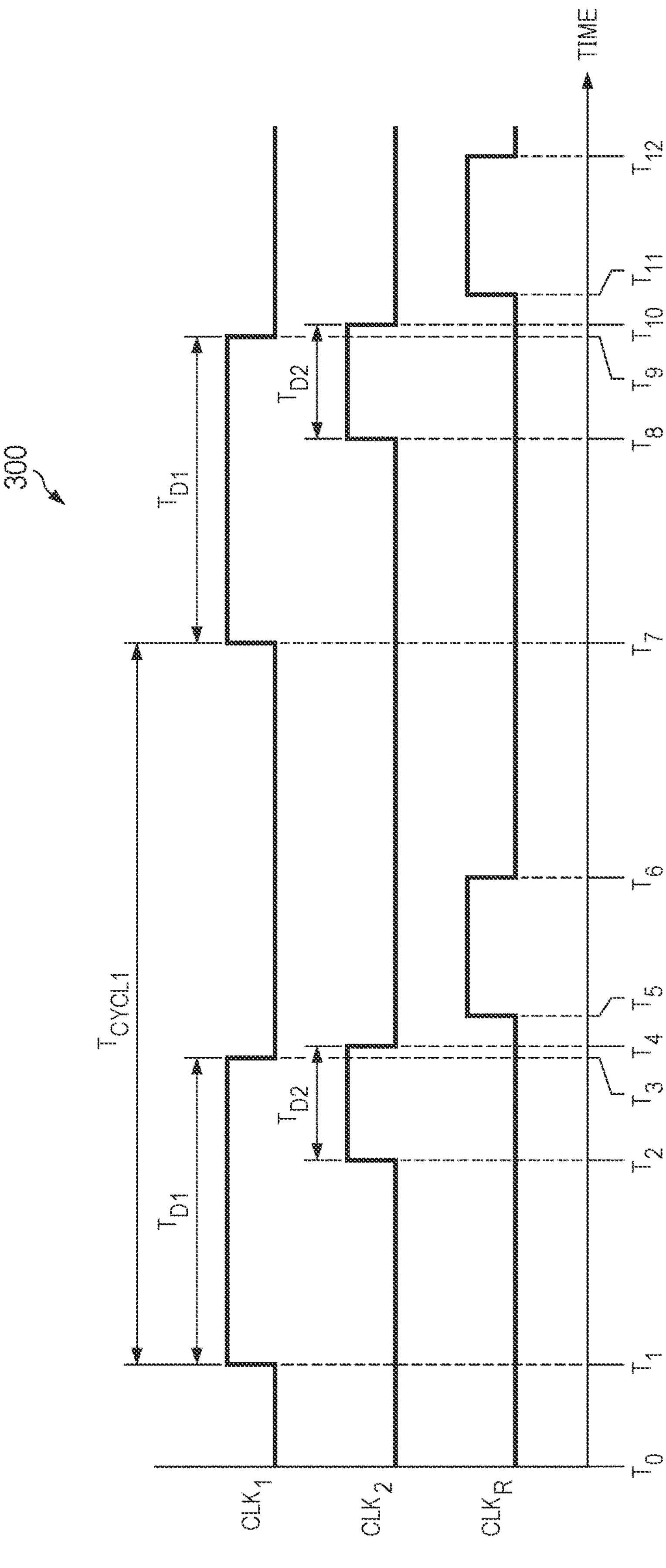
FIG. 3 is an example of a timing diagram of an ADC front-end system.

The operation of the sampling switches $SW_1$ and $SW_2$ is demonstrated in the example of FIG. 3. FIG. 3 is an example of a timing diagram 300 of an ADC front-end system. The timing diagram 300 can describe the operation of the ADC front-end system 200, therefore reference is to be made to the example of FIG. 2 in the following description of the example of FIG. 3.

In the example of FIG. 2, the first sampling switch SW is controlled by a switching signal $CLK_1$ and the second sampling switch $SW_2$ is controlled by a switching signal $CLK_2$. Both of the reset switches $SW_{1R}$ and $SW_{2R}$ are controlled by a switching signal $CLK_R$. In the example of FIG. 3, at a time $T_0$, none of the switching signals $CLK_1$, $CLK_2$, and $CLK_R$ are logic-high, and thus none of the sampling switches $SW_1$ and $SW_2$ or reset switches $SW_{1R}$ and $SW_{2R}$ are activated. Because the first sampling capacitor $C_1$ is directly coupled to the output of the DSA 202 at the terminal 206, the first sampling capacitor $C_1$ samples the analog signal current $I_{RF}$ directly from the DSA 202 at the time $T_0$.

At a first time $T_1$, the switching signal $CLK_1$ is asserted (e.g., transition from logic-low to logic-high) to activate the first sampling switch $SW_1$. Therefore, the activated first sampling switch $SW_1$ conductively couples the terminal 206 and the intermediate node 212. As a result, the charge on the first sampling capacitor C is redistributed with a parasitic capacitance $C_{PAR}$ associated with the intermediate node 212. For example, the parasitic capacitance $C_{PAR}$ is a capacitance associated with the sampling switches $SW_1$ and $SW_2$ and the second reset switch $SW_{2R}$. The first time duration, demonstrated in the example of FIG. 3 as $T_{D1}$, thus begins at the time $T_1$. As described in greater detail herein, the length of the first time duration $T_{D1}$ can be set to control the sampling width, and thus the bandwidth, of the ADC front-end system 200.

At a second time $T_2$, the switching signal $CLK_2$ is asserted to activate the second sampling switch $SW_2$. Therefore, the activated second sampling switch $SW_2$ conductively couples the intermediate node 212 and the terminal 208. At the time $T_2$, both of the switching signals $CLK_1$ and $CLK_2$ are logic-high, and thus both of the sampling switches $SW_1$ and $SW_2$ are activated. As a result, the charge on the first sampling capacitor $C_1$ and the parasitic capacitance $C_{PAR}$ is redistributed with the second sampling capacitor $C_2$. The second time duration, demonstrated in the example of FIG. 3 as $T_{D2}$, thus begins at the time $T_2$. In the example of FIG. 3, the switching signal $CLK_1$ is de-asserted (e.g., transition from logic-high to logic-low) at a time $T_3$ after the time $T_2$, thus resulting in deactivation of the first sampling switch $SW_1$ at the time $T_3$. As a result, the first time duration $T_{D1}$ is concluded at the time $T_3$. Accordingly, between the times $T_2$ and $T_3$, portions of each of the time durations $T_{D1}$ and $T_{D2}$ overlap to provide for concurrent activation of both of the sampling switches $SW_1$ and $SW_2$ to redistribute the initial charges and integrate the analog current $I_{RF}$ between the first sampling capacitor $C_1$ and the second sampling capacitor $C_2$. As a result, the second sampling capacitor $C_2$ can rapidly sample the analog current IRE based on the integration of charge with the first sampling capacitor $C_1$ to provide the analog voltage $V_{RF}$ at the input of the ADC 210.

At a fourth time $T_4$ after the time $T_3$, the switching signal $CLK_2$ is de-asserted, thus resulting in deactivation of the second sampling switch $SW_2$ at the time $T_4$. As a result, the second time duration $T_{D2}$ is concluded at the time $T_4$. The time $T_4$ at which the second sampling switch $SW_2$ is deactivated thus occurs slightly after the time $T_3$ at which the first sampling switch $SW_1$ is deactivated. As a result, the charge on the second sampling capacitor $C_2$, and thus the analog voltage $V_{RF}$, can be stabilized to be converted to the digital output signal DIG by the ADC 210. Additionally, such a sequence of deactivation of the first and second sampling switches $SW_1$ and $SW_2$ ensures that the sampling instance for the second sampling capacitor $C_2$ is based on the first time duration $T_{D1}$ alone.

At a fifth time $T_5$ after the time $T_4$, the switching signal $CLK_R$ is asserted to activate the reset switches $SW_{1R}$ and $SW_{2R}$. The first reset switch $SW_{1R}$ thus couples the first sampling capacitor $C_1$ to a fixed voltage rail, demonstrated in the example of FIG. 2 as ground, to provide a reset of the first sampling capacitor $C_1$. As described herein, the term "reset" with respect to a capacitor refers to a substantially complete discharge of the charge on the capacitor by providing a current path from the capacitor to a fixed voltage rail. Concurrently, the second reset switch $SW_{2R}$ couples the intermediate node 212 to a fixed voltage rail, demonstrated in the example of FIG. 2 as ground, to provide a reset of the parasitic capacitance $C_{PAR}$. The switching signal $CLK_R$ can remain asserted for a time sufficient to completely discharge the first sampling capacitor $C_1$ and the parasitic capacitance $C_{PAR}$, and thus is de-asserted at a time $T_0$.

Subsequent to the time $T_6$, the ADC 210 can be provided with sufficient time to convert the analog voltage $V_{RF}$ to the digital output signal DIG. At a time $T_7$, after an adequate duration of time for the ADC 210 to convert the analog voltage $V_{RF}$ to the digital output signal DIG, the sequence begins again. In the example of FIG. 3, at the time $T_7$, the switching signal $CLK_1$ is again asserted to activate the first sampling switch $SW_1$. Therefore, the activated first sampling switch $SW_1$ conductively couples the terminal 206 and the intermediate node 212. As a result, the charge on the first sampling capacitor $C_1$ is again integrated with the parasitic capacitance $C_{PAR}$ associated with the intermediate node 212. Additionally, at or around the time $T_7$, after generating the digital output signal DIG, the ADC 210 can discharge the second sampling capacitor $C_2$ (e.g., via a switch to provide a current path to a fixed voltage rail).

The timing diagram 300 thus continues with activation of the second sampling switch $SW_2$ at a time $T_8$ to conductively couple the intermediate node 212 and the terminal 208. Therefore, at the time $T_8$, the charge on the first sampling capacitor $C_1$ and the parasitic capacitance $C_{PAR}$ is redistributed with the second sampling capacitor $C_2$. The switching signal $CLK_1$ is de-asserted to deactivate the first sampling switch $SW_1$ at a time $T_0$, followed by the switching signal $CLK_2$ being de-asserted to deactivate the second sampling switch $SW_2$ at a time $T_{10}$. Similar to as described above, the first and second reset switches $SW_{1R}$ and $SW_{2R}$ provide discharge of the first sampling capacitor $C_1$ and the parasitic capacitance $C_{PAR}$ via the switching signal $CLK_R$ between times $T_{11}$ and $T_{12}$. After the time $T_{12}$, the ADC 210 can again convert the analog voltage $V_{RF}$ to the digital output signal DIG.

As described above, the first time duration $T_{D1}$ can be variable to control the sampling width of the ADC front-end system 200, and thus the bandwidth of the RF input signal $RF_{IN}$ that can be converted to the digital output signal DIG. For example, the second time duration $T_{D2}$ has a fixed pulse width to provide sufficient time for charging the second sampling capacitor $C_2$ via charge redistribution and concurrent integration with the first sampling capacitor $C_1$ and the parasitic capacitance $C_{PAR}$. However, the first time duration $T_{D1}$ can have a pulse width that is variable to control the signal bandwidth. The second time duration $T_{D2}$ can have a minimum pulse width that is sufficient to provide charge redistribution of the first sampling capacitor $C_1$, the parasitic capacitance $C_{PAR}$, and the first sampling capacitor $C_2$. However, the first time $T_{D1}$ can have a pulse width that is greater than the minimum to provide a greater time between the rising-edges of each pulse of the first time duration $T_{D1}$, demonstrated in the example of FIG. 3 as a cycle time $T_{CYCL1}$. As an example, the signal bandwidth (Fb) of the ADC front-end system 200 is expressed as follows:

$$F_b \cong 0.44/T_{D1} \quad \text{Equation 1}$$

Therefore, as demonstrated in Equation 1, the sampling width $F_S$ and the first time duration $T_{D1}$ are inversely proportional.

Figure 4:
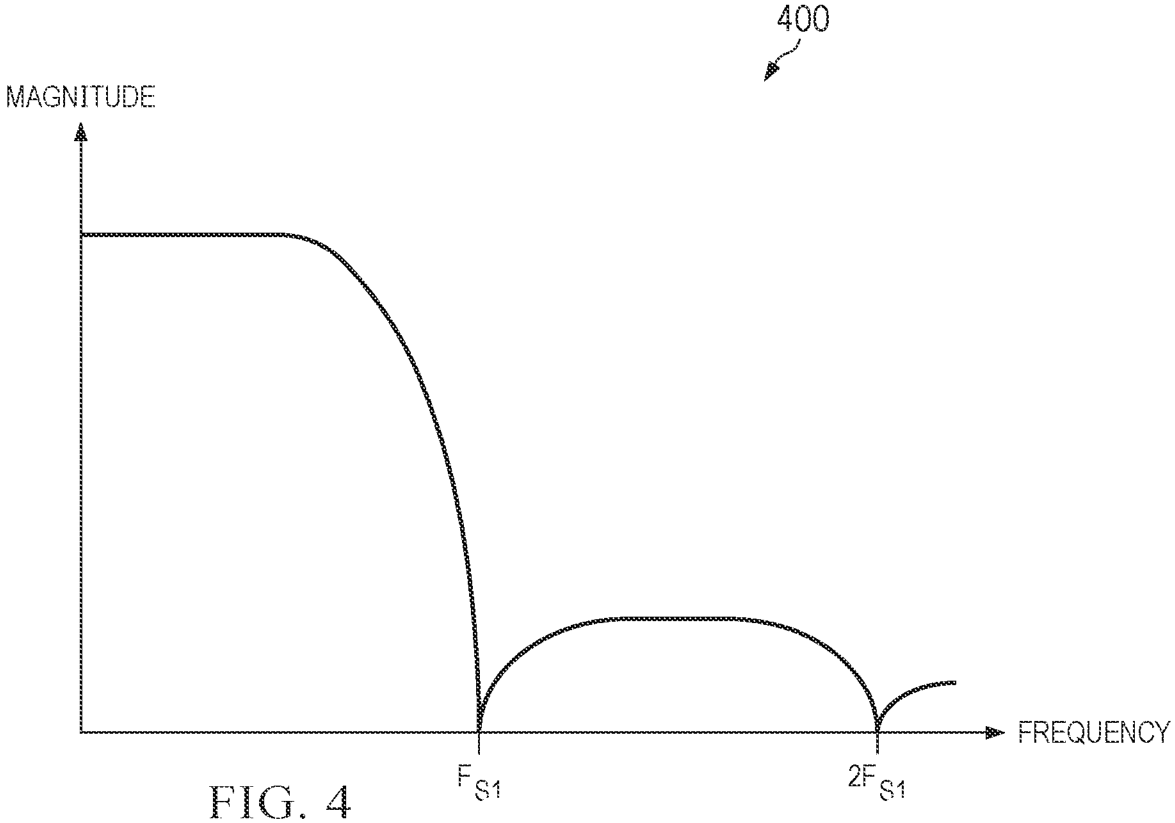
FIG. 4 is an example of a frequency response graph of an ADC front-end system.

FIG. 4 is an example of a frequency response graph 400 of an ADC front-end system. The frequency response graph 400 can correspond to the ADC front-end system 200 operating based on the timing diagram 300 in the example of FIG. 3. Therefore, reference is to be made to the examples of FIGS. 2 and 3 in the following description of the example of FIG. 4. The frequency response graph 400 demonstrates frequency (e.g. a range of signal frequencies) plotted as a function of signal magnitude.

The graph 400 demonstrates a stable frequency response up to a roll-off of the magnitude to a first frequency $F_{S1}$. The graph 400 also includes a smaller magnitude between the first frequency $F_{S1}$ and a second frequency $2F_{S1}$ (e.g. twice the frequency of the first frequency $F_{S1}$). The frequency response graph 400 thus demonstrates a rapid decrease of magnitude from the stable magnitude to the approximately zero magnitude at the first frequency $F_{S1}$. Such a rapid roll-off of the frequency can be significantly more rapid than the roll-off of magnitude of an equivalent other ADC front-end system that implements a passive filter. Additionally, the frequency response graph 400 demonstrates a low out-of-band noise aliasing based on the low magnitude between the first and second frequencies $F_{S1}$ and $2F_{S1}$.

Figure 5:
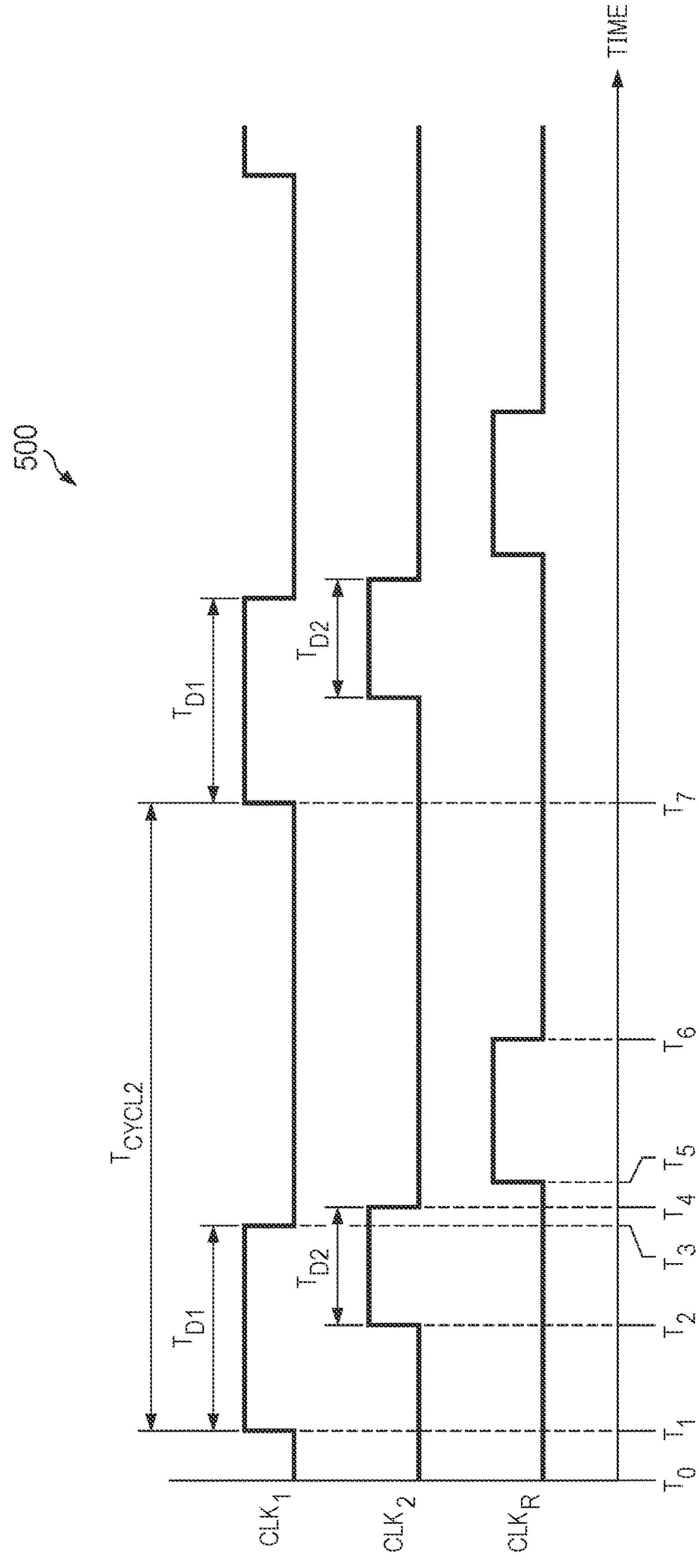
FIG. 5 is another example of a timing diagram of an ADC front-end system.

FIG. 5 is another example of a timing diagram 500 of an ADC front-end system. The timing diagram 500 can describe the operation of the ADC front-end system 200, therefore reference is to be made to the example of FIG. 2 in the following description of the example of FIG. 5.

The timing diagram 500 is demonstrated in the example of FIG. 5 as being approximately the same in sequence as demonstrated in the timing diagram of the example of FIG. 3. At a time $T_1$, and thus the beginning of the first time duration $T_{D1}$, the switching signal $CLK_1$ is asserted to activate the first sampling switch $SW_1$. Therefore, the activated first sampling switch $SW_1$ conductively couples the terminal 206 and the intermediate node 212. As a result, the charge on the first sampling capacitor $C_1$ is redistributed and concurrently integrated with the parasitic capacitance $C_{PAR}$ associated with the intermediate node 212.

At a time $T_2$, and thus the beginning of the second time duration $T_{D2}$, the switching signal $CLK_2$ is asserted to activate second sampling switch $SW_2$ to conductively couple the intermediate node 212 and the terminal 208. Therefore, at the time $T_2$, the charge on the first sampling capacitor $C_1$ and the parasitic capacitance $C_{PAR}$ is redistributed with the second sampling capacitor $C_2$. The switching signal $CLK_1$ is de-asserted to deactivate the first sampling switch $SW_1$ at a time $T_3$, followed by the switching signal $CLK_2$ being de-asserted to deactivate the second sampling switch $SW_2$ at a time $T_4$. Similar to as described above, the first and second reset switches $SW_{1R}$ and $SW_{2R}$ provide discharge of the first sampling capacitor $C_1$ and the parasitic capacitance $C_{PAR}$ via the switching signal $CLK_R$ between times $T_5$ and $T_6$. After the time $T_0$, the ADC 210 can convert the analog voltage $V_{RF}$ to the digital output signal DIG. At a time $T_7$, the cycle repeats with assertion of the switching signal $CLK_1$ to begin a next first time duration $T_{D1}$.

In the example of FIG. 5, the first time duration $T_{D1}$ is demonstrated as having a pulse-width that is less than the pulse-width of the first time duration $T_{D1}$ in the timing diagram 300 of the example of FIG. 3. In the example of FIG. 5, the timing diagram 500 includes a cycle time $T_{CYCL2}$ that is a time duration between the rising-edge of the first time duration $T_{D1}$ and a rising-edge of a next first time duration $T_{D1}$. Because the first time duration $T_{D1}$ in the timing diagram 500 has a pulse-width that is less than the pulse-width of the first time duration $T_{D1}$ in the timing diagram 300, the cycle time $T_{CYCL2}$ is demonstrated in the example of FIG. 5 as being less than the cycle time $T_{CYCL1}$ of the timing diagram 300 in the example of FIG. 3. Therefore, the ADC front-end system 200 can exhibit a higher sampling frequency ($F_S$) operation based on the timing diagram 500 relative to the sampling frequency $F_S$ of the ADC front-end system 200 operating based on the timing diagram 300. Accordingly, as demonstrated herein, the sampling width, and thus the bandwidth, of the ADC front-end system 200 can be controlled by controlling the pulse-width of the first time duration $T_{D1}$.

Figure 6:
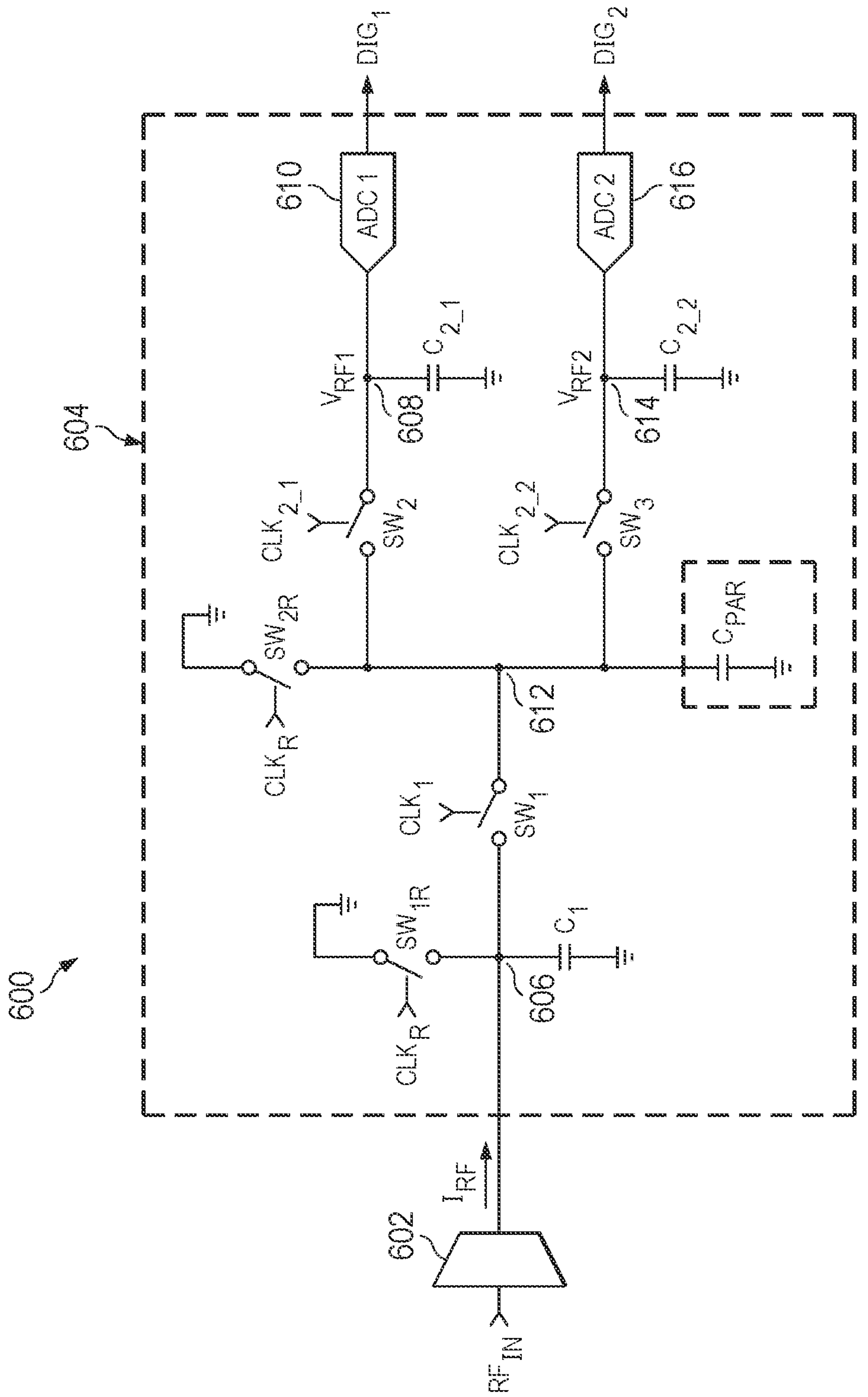
FIG. 6 is another example circuit diagram of an ADC front-end system.

FIG. 6 is another example circuit diagram of an ADC front-end system 600. The ADC front-end system 600 can correspond to the ADC front-end system 100 in the example of FIG. 1. Therefore, reference is to be made to the example of FIG. 1 in the following description of the example of FIG. 6.

The ADC front-end system 600 includes a DSA 602 and a sampling system 604. The DSA 602 receives an analog input signal (e.g., an analog RF signal), demonstrated in the example of FIG. 6 as a signal $RF_{IN}$ and to generate an analog signal current $I_{RF}$ having an amplitude that corresponds to the signal amplitude of the analog input signal $RF_{IN}$. In the example of FIG. 6, the DSA 602 is demonstrated as a transconductance amplifier, but can also include additional components that may be necessary for operation of the DSA 602.

The sampling system 604 includes a first sampling capacitor $C_1$, a second sampling capacitor $C_{2\_1}$, and a third sampling capacitor $C_{2\_2}$. The first sampling capacitor $C_1$ is coupled to a terminal 606 at the output of the DSA 602, the second sampling capacitor $C_{2\_1}$ is coupled to a terminal 608 that is coupled to an input of a first ADC 610, and the third sampling capacitor $C_{2\_2}$ is coupled to a terminal 614 that is coupled to an input of a second ADC 616. In the example of FIG. 6, the first sampling capacitor $C_1$ is demonstrated as a variable capacitor, such as to modify the gain associated with the ADC front-end system 600 based on the capacitance value of the first sampling capacitor $C_1$. The sampling system 604 also includes a first sampling switch $SW_1$, a second sampling switch $SW_2$, and a third sampling switch $SW_3$. The first sampling switch $SW_1$ interconnects the terminal 606 and an intermediate node 612, the second sampling switch $SW_2$ interconnects the intermediate node 612 and the terminal 608, and the third sampling switch $SW_3$ interconnects the intermediate node 612 and the terminal 614. The sampling system 604 further includes a first reset switch $SW_{1R}$ and a second reset switch $SW_{2R}$. The first reset switch $SW_{1R}$ is coupled to the terminal 606 and the second reset switch $SW_{2R}$ is coupled to the intermediate node 612.

As shown in FIG. 6, first terminals of $C_1$, $SW_1$, and $SW_{1R}$ are coupled to the output of the DSA 602. Second terminals of $C_1$ and $SW_{1R}$ are coupled to a reference terminal (e.g., a ground terminal at a ground potential). A second terminal of $SW_1$ is coupled to first terminals of $SW_2$, $SW_3$, and $SW_{2R}$. A second terminal of $SW_{2R}$ is coupled to the reference terminal. A second terminal of $SW_2$ is coupled to a first terminal of $C_{2\_1}$ and an input of the ADC 610. A second terminal of $SW_3$ is coupled to a first terminal of $C_{2\_2}$ and an input of the ADC 616. A second terminal of $C_{2\_1}$ and $C_{2\_2}$ is coupled to the reference terminal. A representative parasitic capacitance $C_{PAR}$ is shown between the reference terminal and an intersection of the second terminal of $SW_1$ and the first terminals of $SW_2$, $SW_3$, and $SW_{2R}$ (in which the intersection of these three terminals is represented as the node 612).

As described herein, the first sampling switch $SW_1$ can be activated for a first time duration and each of the second and third sampling switches $SW_2$ and $SW_3$ can be activated for a second time duration in an interleaved manner, such that one of the second and third sampling switches $SW_2$ and $SW_3$ can be activated concurrently with the first sampling switch $SW_1$ during an overlapping portion of the first and second time durations associated with the alternately activated second and third sampling switches $SW_2$ and $SW_3$. Therefore, the analog signal current $I_{RF}$ can be sampled on both the first sampling capacitor $C_1$ and the second sampling capacitor $C_{2\_1}$ concurrently, or both the first sampling capacitor $C_1$ and the third sampling capacitor $C_{2\_2}$ concurrently. Accordingly, the analog voltages, demonstrated in the example of FIG. 6 as $V_{RF1}$ and $V_{RF2}$, corresponding respectively to the analog signal current, can be alternately integrated as charge on the first sampling capacitor $C_1$ and the second and third sampling capacitors $C_{2\_1}$ and $C_{2\_2}$ to rapidly and alternately sample the analog signal current $I_{RF}$ on the second and third sampling capacitors $C_{2\_1}$ and $C_{2\_2}$ as the analog voltages $V_{RF1}$ and $V_{RF2}$, respectively, based on which the respective ADCs 610 and 616 can generate digital output signals $DIG_1$ and $DIG_2$, respectively.

Figure 7:
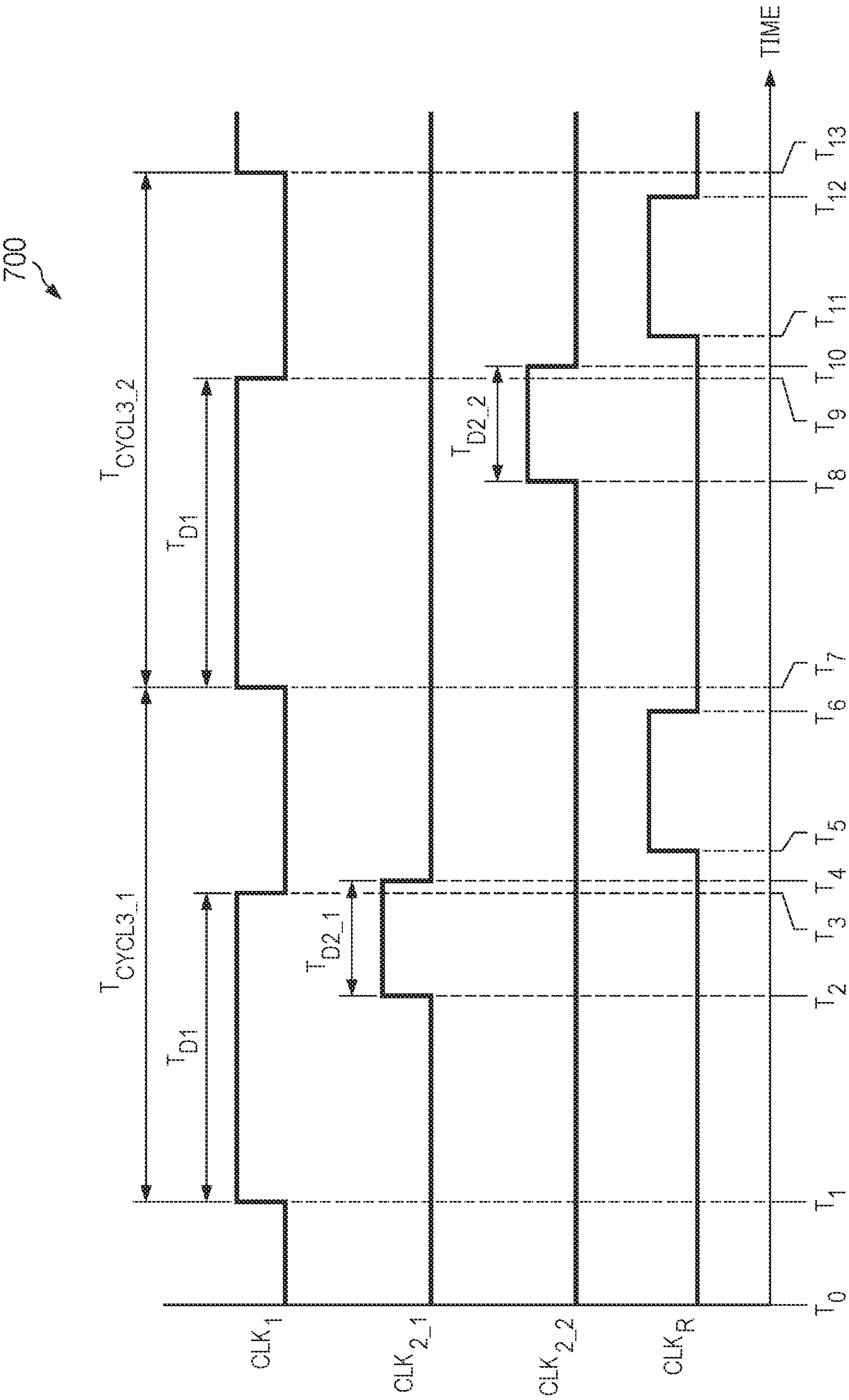
FIG. 7 is another example of a timing diagram of an ADC front-end system.

The operation of the sampling switches $SW_1$, $SW_2$, and $SW_3$ is demonstrated in the example of FIG. 7. FIG. 7 is another example of a timing diagram 700 of an ADC front-end system. The timing diagram 700 can describe the operation of the ADC front-end system 600, therefore reference is to be made to the example of FIG. 6 in the following description of the example of FIG. 7. The examples of FIGS. 3, 5, and 7 are not limited to be exactly to scale time-wise with respect to each other, but are instead merely demonstrated as examples of the operational sequences of the sampling switches $SW_1$, $SW_2$, and $SW_3$.

In the example of FIG. 6, the first sampling switch $SW_1$ is controlled by a switching signal $CLK_1$, the second sampling switch $SW_2$ is controlled by a switching signal $CLK_{2\_1}$, and the third sampling switch $SW_3$ is controlled by a switching signal $CLK_{2\_2}$. Both of the reset switches $SW_{1R}$ and $SW_{2R}$ are controlled by a switching signal $CLK_R$. In the example of FIG. 7, at a time $T_0$, none of the switching signals $CLK_1$, $CLK_{2\_1}$, $CLK_{2\_2}$, and $CLK_R$ are logic-high, and thus none of the sampling switches $SW_1$, $SW_2$, and $SW_3$ or reset switches $SW_{1R}$ and $SW_{2R}$ are activated. Because the first sampling capacitor $C_1$ is directly coupled to the output of the DSA 602 at the terminal 606, the first sampling capacitor $C_1$ samples the analog signal current $I_{RF}$ directly from the DSA 602 at the time $T_0$.

At a first time $T_1$, the switching signal $CLK_1$ is asserted (e.g., transition from logic-low to logic-high) to activate the first sampling switch $SW_1$. Therefore, the activated first sampling switch $SW_1$ conductively couples the terminal 606 and the intermediate node 612. As a result, the charge on the first sampling capacitor $C_1$ is redistributed with a parasitic capacitance $C_{PAR}$ associated with the intermediate node 612. For example, the parasitic capacitance $C_{PAR}$ is a capacitance associated with the sampling switches $SW_1$, $SW_2$, and $SW_3$ and the second reset switch $SW_{2R}$. The first time duration, demonstrated in the example of FIG. 7 as $T_{D1}$, thus begins at the time $T_1$. Similar to as described above, the length of the first time duration $T_{D1}$ can be set to control the sampling width, and thus the bandwidth, of the ADC front-end system 600.

At a second time $T_2$, the switching signal $CLK_{2\_1}$ is asserted to activate the second sampling switch $SW_2$. Therefore, the activated second sampling switch $SW_2$ conductively couples the intermediate node 612 and the terminal 608. At the time $T_2$, both of the switching signals $CLK_1$ and $CLK_{2\_1}$ are logic-high, and thus both of the sampling switches $SW_1$ and $SW_2$ are activated. As a result, the charge on the first sampling capacitor $C_1$ and the parasitic capacitance $C_{PAR}$ is redistributed with the second sampling capacitor $C_{2\_1}$. A second time duration, demonstrated in the example of FIG. 7 as $T_{D2\_1}$, thus begins at the time $T_2$. In the example of FIG. 7, the switching signal $CLK_1$ is de-asserted (e.g., transition from logic-high to logic-low) at a time $T_3$ after the time $T_2$, thus resulting in deactivation of the first sampling switch $SW_1$ at the time $T_3$. As a result, the first time duration $T_{D1}$ is concluded at the time $T_3$. Accordingly, between the times $T_2$ and $T_3$, portions of each of the time durations $T_{D1}$ and $T_{D2\_1}$ overlap to provide for concurrent activation of both of the sampling switches $SW_1$ and $SW_2$ to integrate the analog signal current $I_{RF}$ between the first sampling capacitor $C_1$ and the second sampling capacitor $C_{2\_1}$. As a result, the second sampling capacitor $C_{2\_1}$ can rapidly sample the analog signal current $I_{RF}$ based on the integration of charge with the first sampling capacitor $C_1$ to provide the analog voltage $V_{RF1}$ at the input of the ADC 610.

At a fourth time $T_4$ after the time $T_3$, the switching signal $CLK_{2\_1}$ is de-asserted, thus resulting in deactivation of the second sampling switch $SW_2$ at the time $T_4$. As a result, the second time duration $T_{D2\_1}$ is concluded at the time $T_4$. The time $T_4$ at which the second sampling switch $SW_2$ is deactivated thus occurs slightly after the time $T_3$ at which the first sampling switch $SW_1$ is deactivated. As a result, the charge on the second sampling capacitor $C_{2\_1}$, and thus the analog voltage $V_{RF1}$, can be stabilized to be converted to the digital output signal $DIG_1$ by the ADC 610. Additionally, such a sequence of deactivation of the first and second sampling switches $SW_1$ and $SW_2$ can ensure that the sampling instance for the second sampling capacitor $C_{2\_1}$ is based on the first time duration $T_{D1}$ alone.

At a fifth time $T_5$ after the time $T_4$, the switching signal $CLK_R$ is asserted to activate the reset switches $SW_{1R}$ and $SW_{2R}$. The first reset switch $SW_{1R}$ thus couples the first sampling capacitor $C_1$ to a fixed voltage rail or terminal, demonstrated in the example of FIG. 6 as ground, to provide a reset of the first sampling capacitor $C_1$. Concurrently, the second reset switch $SW_{2R}$ couples the intermediate node 612 to a fixed voltage rail, demonstrated in the example of FIG. 6 as ground, to provide a reset of the parasitic capacitance $C_{PAR}$. The switching signal $CLK_R$ can remain asserted for a time sufficient to completely discharge the first sampling capacitor $C_1$ and the parasitic capacitance $C_{PAR}$, and thus is de-asserted at a time $T_6$.

As described above, the operation of the ADCs 610 and 616 are interleaved. The operations described between the times $T_1$ and $T_6$ correspond to a first cycle, demonstrated in the example of FIG. 7 as a time duration $TCYCL_{3\_1}$, corresponding to sampling of the analog signal current $I_{RF}$ to the first analog voltage $V_{RF1}$ that is converted to the first digital signal $DIG_1$ by the first ADC 610. Therefore, at a time $T_7$, the first cycle $TCYCL_{3\_1}$ is concluded and a second cycle, demonstrated in the example of FIG. 7 as a time duration $TCYCL_{3\_2}$, begins. The second cycle $TCYCL_{3\_2}$ corresponds to the sampling of the analog signal current $I_{RF}$ as the second analog voltage $V_{RF2}$ that is converted to the second digital signal $DIG_2$ by the second ADC 616.

At the time $T_7$, the switching signal $CLK_1$ is again asserted to activate the first sampling switch $SW_1$. Therefore, the activated first sampling switch $SW_1$ conductively couples the terminal 606 and the intermediate node 612. As a result, the charge on the first sampling capacitor $C_1$ is again redistributed with the parasitic capacitance $C_{PAR}$ associated with the intermediate node 612.

The timing diagram 700 thus continues with activation of the third sampling switch $SW_3$ at a time $T_8$ to conductively couple the intermediate node 612 and the terminal 614. Therefore, the activated first sampling switch $SW_1$ conductively couples the terminal 606 and the intermediate node 612. As a result, the charge on the first sampling capacitor $C_1$ is integrated with a parasitic capacitance $C_{PAR}$ associated with the intermediate node 612. At a time $T_8$, the switching signal $CLK_{2\_2}$ is asserted to activate the third sampling switch $SW_3$. Therefore, the activated third sampling switch $SW_3$ conductively couples the intermediate node 612 and the terminal 614. At the time $T_8$, both of the switching signals $CLK_1$ and $CLK_{2\_2}$ are logic-high, and thus both of the sampling switches $SW_1$ and $SW_3$ are activated. As a result, the charge on the first sampling capacitor $C_1$ and the parasitic capacitance $C_{PAR}$ is redistributed with the third sampling capacitor $C_{2\_2}$. Another second time duration, demonstrated in the example of FIG. 7 as $T_{D2\_2}$, thus begins at the time $T_8$.

In the example of FIG. 7, the switching signal $CLK_1$ is de-asserted at a time $T_0$ after the time $T_8$, thus resulting in deactivation of the first sampling switch $SW_1$ at the time $T_0$. As a result, the first time duration $T_{D1}$ is concluded at the time $T_0$. Accordingly, between the times $T_8$ and $T_0$, portions of each of the time durations $T_{D1}$ and $T_{D2\_2}$ overlap to provide for concurrent activation of both of the sampling switches $SW_1$ and $SW_3$ to integrate the analog signal current $I_{RF}$ between the first sampling capacitor $C_1$ and the third sampling capacitor $C_{2\_2}$. As a result, the third sampling capacitor $C_{2\_2}$ can rapidly sample the analog signal current $I_{RF}$ based on the integration of charge with the first sampling capacitor $C_1$ to provide the second analog voltage $V_{RF2}$ at the input of the ADC 616.

At a time $T_{10}$ after the time $T_0$, the switching signal $CLK_{2\_2}$ is de-asserted, thus resulting in deactivation of the third sampling switch $SW_3$ at the time $T_4$. As a result, the second time duration $T_{D2\_2}$ is concluded at the time $T_{10}$. The time $T_{10}$ at which the third sampling switch $SW_3$ is deactivated thus occurs slightly after the time $T_0$ at which the first sampling switch $SW_1$ is deactivated. As a result, the charge on the third sampling capacitor $C_{2\_2}$, and thus the analog voltage $V_{RF2}$, can be stabilized to be converted to the digital output signal $DIG_2$ by the ADC 616. Additionally, such a sequence of deactivation of the first and second sampling switches $SW_1$ and $SW_3$ can ensure that the sampling instance for the third sampling capacitor $C_{2\_2}$ is based on the first time duration $T_{D1}$ alone.

Similar to as described above, at a time $T_{11}$ after the time $T_{10}$, the switching signal $CLK_R$ is asserted to activate the reset switches $SW_{1R}$ and $SW_{2R}$. The first reset switch $SW_{1R}$ thus couples the first sampling capacitor $C_1$ to the fixed voltage rail to provide a reset of the first sampling capacitor $C_1$, and the second reset switch $SW_{2R}$ couples the intermediate node 612 to the fixed voltage rail to provide a reset of the parasitic capacitance $C_{PAR}$. The switching signal $CLK_R$ can remain asserted for a time sufficient to approximately completely discharge the first sampling capacitor $C_1$ and the parasitic capacitance $C_{PAR}$, and thus is de-asserted at a time $T_{12}$. At a time $T_{13}$, the switching signal $CLK_1$ is again asserted to activate the first sampling switch $SW_1$. Thus, at the time $T_{13}$, the second cycle $T_{CYCL3\_2}$ concludes and a new cycle begins. Additionally, at or around the time $T_{12}$ and before the time $T_{13}$, after generating the first digital output signal $DIG_1$, the first ADC 610 can discharge the second sampling capacitor $C_{2\_1}$ (e.g., via a switch to provide a current path to a fixed voltage rail) to be ready for the next cycle.

The interleaving of the operation of the ADCs 610 and 616 can provide for a significantly greater sampling width of the ADC front-end system 600 relative to the ADC front-end system 200. For example, after the time $T_4$ in the first cycle $T_{CYCL3\_1}$, and thus upon the analog voltage $V_{RF1}$ being provided across the second sampling capacitor $C_{2\_1}$, the ADC 610 is provided sufficient time to convert the analog voltage $V_{RF1}$ to the first digital signal $DIG_1$ during the second cycle $T_{CYCL3\_2}$. Accordingly, the time duration between the time $T_5$ (e.g., the conclusion of discharging the first sampling capacitor $C_1$ and the parasitic capacitance $C_{PAR}$) and the time $T_6$ can be minimal, such that the second cycle $T_{CYCL3\_2}$ can begin before the ADC 610 has sufficient time to convert the analog voltage $V_{RF1}$ to the first digital signal $DIG_1$.

Similarly, after the time $T_{10}$ in the second cycle $T_{CYCL3\_2}$, and thus upon the analog voltage $V_{RF2}$ being provided across the third sampling capacitor $C_{2\_2}$, the ADC 616 can be provided sufficient time to convert the analog voltage $V_{RF2}$ to the second digital signal $DIG_2$ during a next first cycle $T_{CYCL3\_1}$ (e.g., corresponding to conversion of the first analog voltage $V_{RF1}$ to the first digital signal $DIG_1$). Accordingly, the time duration between the time $T_{12}$ (e.g., the conclusion of discharging the first sampling capacitor $C_1$ and the parasitic capacitance $C_{PAR}$) and the time $T_{13}$ can be minimal, such that the next first cycle $T_{CYCL3\_1}$ can begin before the ADC 616 has sufficient time to convert the analog voltage $V_{RF2}$ to the first digital signal $DIG_2$. Accordingly, the time durations of the cycles $T_{CYCL3\_1}$ and $T_{CYCL3\_2}$ can be shorter than the time durations of the cycles $T_{CYCL1}$ and $T_{CYCL2}$ in the examples of FIGS. 3 and 5, respectively. Furthermore, similar to as described above, the time duration $T_{D1}$ in the example of FIG. 7 is adjusted to further control the sampling width $F_S$, and thus the bandwidth, of the ADC front-end system 600. As a result, the ADC front-end system 600 can have a faster sampling width $F_S$ than the ADC front-end system 200.

Figure 8:
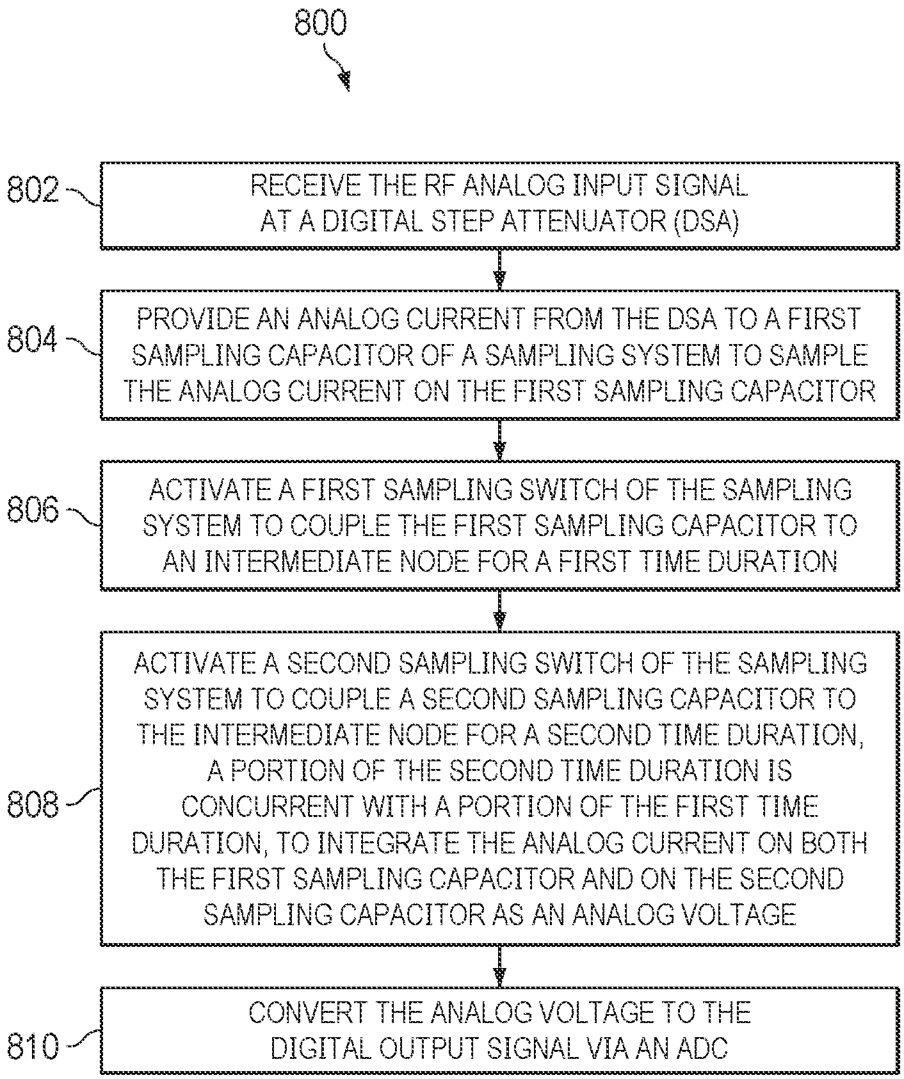
FIG. 8 is an example of a method for converting a radio frequency (RF) analog input signal into a digital output signal.

In view of the foregoing structural and functional features described above, a methodology in various aspects of the description will be better appreciated with reference to FIG. 8. The method of FIG. 8 is not limited by the illustrated order, as some aspects could, in the present description, occur in different orders and/or concurrently with other aspects from that shown and described herein. Moreover, not all illustrated features may be required to implement a methodology in an aspect of the present examples.

FIG. 8 illustrates an example of a method 800 for converting an RF analog input signal (e.g., the RF analog input signal $RF_{IN}$) into a digital output signal (e.g., digital output signal DIG). At 802, the RF analog input signal is received at a DSA (e.g., the DSA 102). At 804, an analog signal current (e.g., the analog signal current $I_{RF}$) is provided from the DSA to a first sampling capacitor (e.g., the first sampling capacitor $C_1$) of a sampling system (e.g., the sampling system 104) to sample the analog signal current on the first sampling capacitor. At 806, a first sampling switch (e.g., the first sampling switch $SW_1$) of the sampling system is activated to couple the first sampling capacitor to an intermediate node (e.g., the intermediate node 212) for a first time duration (e.g., the first time duration $T_{D1}$). At 808, a second sampling switch (e.g., the second sampling switch $SW_2$) of the sampling system is activated to couple a second sampling capacitor (e.g., the second sampling capacitor $C_2$) to the intermediate node for a second time duration (e.g., the second time duration $T_{D2}$). A portion of the second time duration can be concurrent with a portion of the first time duration to integrate the analog signal current on both the first sampling capacitor and the second sampling capacitor as a second sampling voltage on the second sampling capacitor. At 810, the second sampling voltage is converted to the digital output signal via an ADC (e.g., the ADC(s) 110).

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

In this description, the term "couple" can cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

In this description, a device that is "configured to" perform a task or function can be configured (e.g., programmed and/or hardwired) at a time of manufacturing by a manufacturer to perform the function and/or can be configurable (or reconfigurable) by a user after manufacturing to perform the function and/or other additional or alternative functions. The configuring can be through firmware and/or software programming of the device, through a construction and/or layout of hardware components and interconnections of the device, or a combination thereof. Furthermore, a circuit or device that is described herein as including certain components can instead be configured to couple to those components to form the described circuitry or device. For example, a structure described herein as including one or more semiconductor elements (such as transistors), one or more passive elements (such as resistors, capacitors, and/or inductors), and/or one or more sources (such as voltage and/or current sources) can instead include only the semiconductor elements within a single physical device (e.g., a semiconductor die and/or integrated circuit (IC) package) and can be configured to couple to at least some of the passive elements and/or the sources to form the described structure, either at a time of manufacture or after a time of manufacture, such as by an end-user and/or a third-party.

The phrase "based on" means "based at least in part on". Therefore, if X is based on Y, X can be a function of Y and any number of other factors.

Modifications are possible in the described embodiments, and other embodiments are possible, within the scope of the claims.

What is claimed is:

1. A system comprising:
- a digital step attenuator (DSA) having an input and an output;
- a first sampling capacitor having a terminal coupled to the output of the DSA;
- a first sampling switch having first and second terminals, the first terminal of the first sampling switch coupled to the output of the DSA;
- a second sampling switch having first and second terminals, the first terminal of the second sampling switch coupled to the second terminal of the first sampling switch;
- a second sampling capacitor having a terminal coupled to the second terminal of the second sampling switch; and
- an ADC having an input and an output, the input of the ADC coupled to the terminal of the second sampling capacitor, wherein:
  - the first sampling switch is configured to be activated to couple the first sampling capacitor to an intermediate node during a first time duration; and
  - the second sampling switch is configured to be activated to couple the second sampling capacitor to the intermediate node during a second time duration, wherein a portion of the second time duration is concurrent with a portion of the first time duration.

2. The system of claim 1, further comprising a first reset switch having an input and an output, the input of the first reset switch coupled to the output of the DSA and the output of the first reset switch coupled to a reference terminal.

3. The system of claim 2, further comprising a second reset switch having an input and an output, the input of the second reset switch coupled to the second terminal of the first sampling switch and the terminal of the second reset switch coupled to the reference terminal.

4. The system of claim 1, wherein the input of the DSA is adapted to receive an analog input signal, the output of the ADC is adapted to provide a digital output signal.

5. The system of claim 1, further comprising:
- a third sampling switch having an input and an output, the input of the third sampling switch coupled to the second terminal of the first sampling switch;
- a third sampling capacitor having an input coupled to the output of the third sampling switch; and
- a second ADC having an input and an output, the input of the second ADC coupled to the output of the third sampling switch.

6. The system of claim 1, further comprising a reset switch coupled between the intermediate node and ground.

7. A system comprising:
- a digital step attenuator (DSA) having an input and an output;
- a sampling system having an input coupled to the output of the DSA, the sampling system including a first sampling capacitor, a second sampling capacitor, and at least one sampling switch, the sampling system configured to sample an analog signal current provided from the DSA on the first sampling capacitor and the second sampling capacitor concurrently in response to activation of the at least one sampling switch to integrate the analog signal current as a sampling voltage on both the first and second sampling capacitors; and
- an ADC having an input and an output, the input of the ADC coupled to the output of the sampling system;
- wherein the at least one sampling switch comprises:
  - a first sampling switch configured to be activated to couple the first sampling capacitor to an intermediate node during a first time duration; and
  - a second sampling switch configured to be activated to couple the second sampling capacitor to the intermediate node during a second time duration, wherein a portion of the second time duration is concurrent with a portion of the first time duration.

8. The system of claim 7, wherein the first sampling switch is configured to be activated at a first time, the second sampling switch is configured to be activated at a second time after the first time, the first sampling switch is configured to be deactivated at a third time after the second time, and the second sampling switch is configured to be deactivated at a fourth time after the third time, wherein the first time duration corresponds to a time between the first time and the third time, and wherein the second time duration corresponds to a time between the second time and the fourth time.

9. The system of claim 8, wherein the first sampling switch is configured to be activated at the first time to integrate the analog signal current on the first sampling capacitor and on a parasitic capacitance associated with the first and second sampling switches, and wherein the second sampling switch is configured to be activated at the second time to integrate the analog signal current on the first sampling capacitor, on the parasitic capacitance associated with the first and second sampling switches, and on the second sampling capacitor.

10. The system of claim 7, wherein the sampling system further comprises:

a first reset switch configured to be activated to discharge the first sampling capacitor; and a second reset switch configured to be activated to discharge a charge associated with a parasitic capacitance of the intermediate node, the first and second reset switches being activated concurrently after the first and second time durations.

11. The system of claim 7, wherein the first time duration is variable to define a sampling bandwidth of the ADC.

12. The system of claim 11, wherein the second time duration is approximately constant, wherein the portion of the second time duration that is concurrent with the portion of the first time duration is approximately constant, such that a remaining portion of the first time duration is variable to define the sampling bandwidth of the ADC.

13. The system of claim 7, wherein the first sampling capacitor is configured as a variable capacitor to modify a gain associated with the system based on a capacitance value of the first sampling capacitor.

14. The system of claim 7, wherein the sampling system comprises a plurality of second sampling capacitors that are each configured to integrate the analog signal current as the sampling voltage with the first sampling capacitor in an interleaved manner, wherein the ADC is one of a plurality of ADCs that are each configured to convert the sampling voltage from a respective one of the second sampling capacitors into a digital output signal in the interleaved manner.

15. An integrated circuit (IC) comprising the system of claim 7.

16. A method comprising:

receiving an analog input signal;

providing an analog signal current, representative of the analog input signal, at an output of a digital step attenuator for direct sampling by a first sampling capacitor;

activating a first sampling switch coupled to the first sampling capacitor for a first time duration;

activating a second sampling switch to couple a second sampling capacitor to the first sampling capacitor for a second time duration, in which a portion of the second time duration overlaps a portion of the first time duration, to provide an analog voltage; and converting the analog voltage to a digital output signal.

17. The method of claim 16, wherein activating the first sampling switch comprises activating the first sampling switch at a first time, wherein activating the second sampling switch comprises activating the second sampling switch at a second time after the first time, and wherein the method further comprises:

deactivating the first sampling switch at a third time after the second time; and deactivating the second sampling switch at a fourth time after the third time, the first time duration corresponds to a time between the first time and the third time and the second time duration corresponds to a time between the second time and the fourth time.

18. The method of claim 17, further comprising:

activating a first reset switch to discharge the first sampling capacitor at a fifth time after the first and second time durations; and activating a second reset switch to discharge a charge associated with a parasitic capacitance of an intermediate node at the fifth time.

19. The method of claim 16, further comprising setting a length of the first time duration to define a sampling bandwidth of an ADC.

20. The method of claim 16, wherein the second sampling switch is a first of a plurality of second sampling switches, wherein the second sampling capacitor is a first of a plurality of second sampling capacitors, wherein the method further comprises:

activating the second sampling switches in an interleaved manner to couple a respective one of a respective sampling capacitors to an intermediate node for the second time duration to integrate the analog signal current on both the first sampling capacitor and on the respective one of the second sampling capacitors as the second sampling voltage; and converting the respective sampling voltage to the digital output signal via a respective ADC in the interleaved manner.

* * * * *